US009500795B2

(12) United States Patent
Itoga et al.

(10) Patent No.: US 9,500,795 B2
(45) Date of Patent: Nov. 22, 2016

(54) AREA LIGHT SOURCE DEVICE AND DISPLAY DEVICE USING SAME

(71) Applicant: Mitsubishi Electric Corporation, Tokyo (JP)

(72) Inventors: Kenji Itoga, Tokyo (JP); Akimasa Yuuki, Tokyo (JP); Kazutada Takaira, Tokyo (JP); Seiji Sakai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 36 days.

(21) Appl. No.: 14/413,788

(22) PCT Filed: Mar. 8, 2013

(86) PCT No.: PCT/JP2013/056445
§ 371 (c)(1),
(2) Date: Jan. 9, 2015

(87) PCT Pub. No.: WO2014/041828
PCT Pub. Date: Mar. 20, 2014

(65) Prior Publication Data
US 2015/0192724 A1 Jul. 9, 2015

(30) Foreign Application Priority Data

Sep. 13, 2012 (JP) .................. 2012-201859

(51) Int. Cl.
F21V 7/04 (2006.01)
F21V 8/00 (2006.01)
G02F 1/1335 (2006.01)

(52) U.S. Cl.
CPC ............. *G02B 6/002* (2013.01); *G02B 6/0016* (2013.01); *G02B 6/0068* (2013.01);
(Continued)

(58) Field of Classification Search
CPC ................ G02B 6/0015; G02B 6/0016; G02B 6/0018; G02B 6/002
See application file for complete search history.

(56) References Cited

U.S. PATENT DOCUMENTS 6,607,297 B2 8/2003 Egawa
7,226,197 B2 6/2007 Hayashi et al.
(Continued)

FOREIGN PATENT DOCUMENTS

CN 1646855 A 7/2005
CN 2731497 Y 10/2005
(Continued)

OTHER PUBLICATIONS

Notification Concerning Transmittal of International Preliminary Report on Patentability and Translation of Written Opinion of the International Searching Authority; PCT/JP2013/056445; issued on Mar. 26, 2015.
(Continued)

*Primary Examiner* — Peggy Neils
*Assistant Examiner* — Alexander Garlen
(74) *Attorney, Agent, or Firm* — Studebaker & Brackett PC

(57) ABSTRACT

The present invention relates to an area light source device and a display device using the area light source device. The present invention includes a point light source, and a light guide plate. The light guide plate includes a protruding structure on a light entrance surface side. The protruding structure protrudes from a light exit surface side or a counter light exit surface side opposite from the light exit surface. The point light source includes an arrangement of point light sources. The protruding structure is configured such that oblique cylinders each having a semicircular upper surface protrude and arranged in a direction of the arrangement of
(Continued)

the point light sources. The point light sources are arranged so that the lines of intersection of adjacent ones of the oblique cylinders coincide with the middles of the point light sources, respectively.

16 Claims, 13 Drawing Sheets

(52) U.S. Cl.
CPC ....... *G02F 1/133615* (2013.01); *G02B 6/0028* (2013.01); *G02B 6/0031* (2013.01)

(56) References Cited

U.S. PATENT DOCUMENTS

| | | |
|---|---|---|
| 8,079,743 B2 | 12/2011 | Bailey et al. |
| 8,089,578 B2 | 1/2012 | Kurata et al. |
| 8,129,731 B2 | 3/2012 | Vissenberg et al. |
| 8,210,730 B2 | 7/2012 | Kurata et al. |
| 8,345,184 B2 | 1/2013 | Shinohawa et al. |
| 8,517,591 B2 | 8/2013 | Nakamoto et al. |
| 8,599,332 B2 | 12/2013 | Yabe et al. |
| 2002/0041500 A1 | 4/2002 | Egawa |
| 2005/0174803 A1 | 8/2005 | Hayashi et al. |
| 2006/0078267 A1 | 4/2006 | Cha et al. |
| 2006/0164863 A1* | 7/2006 | Chang ................. G02B 6/0016 362/621 |
| 2007/0058108 A1* | 3/2007 | Uehara ................. G02B 6/005 349/86 |
| 2009/0073347 A1* | 3/2009 | Takahashi ............... G02B 6/002 349/65 |
| 2009/0213619 A1 | 8/2009 | Nakamoto et al. |
| 2010/0065860 A1 | 3/2010 | Vissenberg et al. |
| 2010/0195019 A1 | 8/2010 | Shinohara et al. |
| 2011/0205759 A1* | 8/2011 | Kurata ................. G02B 6/0016 362/611 |
| 2011/0211368 A1 | 9/2011 | Mishima |
| 2011/0286238 A1 | 11/2011 | Kurata et al. |
| 2012/0002437 A1 | 1/2012 | Yabe et al. |
| 2013/0044514 A1* | 2/2013 | Chang ................. G02B 6/0028 362/609 |
| 2013/0141669 A1 | 6/2013 | Shinohara et al. |
| 2013/0250614 A1 | 9/2013 | Thompson et al. |

FOREIGN PATENT DOCUMENTS

| | | |
|---|---|---|
| CN | 10151088 A | 8/2009 |
| CN | 101529158 A | 9/2009 |
| CN | 102124264 A | 7/2011 |
| CN | 202075441 U | 12/2011 |
| EP | 1195555 A1 | 10/2002 |
| JP | 2003-272428 A | 9/2003 |
| JP | 2007-335312 A | 12/2007 |
| JP | 2011-192489 A | 9/2011 |
| JP | 2011-192490 A | 9/2011 |
| JP | 2012-014909 A | 1/2012 |
| JP | 2012-104506 A | 5/2012 |
| JP | 2012-164435 A | 8/2012 |
| KR | 1020070099791 A | 10/2007 |
| WO | 2007/018361 A1 | 2/2007 |
| WO | 2008/153024 A1 | 12/2008 |
| WO | 2010/052991 A1 | 5/2010 |
| WO | 2010/070823 A1 | 6/2010 |
| WO | 2012/075352 A1 | 6/2012 |

OTHER PUBLICATIONS

International Search Report; PCT/JP2013/056445; Apr. 23, 2013.
An Office Action; "Decision of Refusal," issued by the Japanese Patent Office on Sep. 1, 2015, which corresponds to Japanese Patent Application No. 2014-535387 and is related to U.S. Appl. No. 14/413,788; with English language partial translation.
An Office Action; "Notification of Reasons for Refusal," issued by the Japanese Patent Office on Jun. 16, 2015, which corresponds to Japanese Patent Application No. 2014-535387 and is related to U.S. Appl. No. 14/413,788; with English language partial translation.
A Search Report issued by the Patent Office of the People's Republic of China which corresponds to Patent Application No. 201380047842.6 and is related to U.S Appl. No. 14/413,788; with English language partial translation.

* cited by examiner

F I G. 1 3
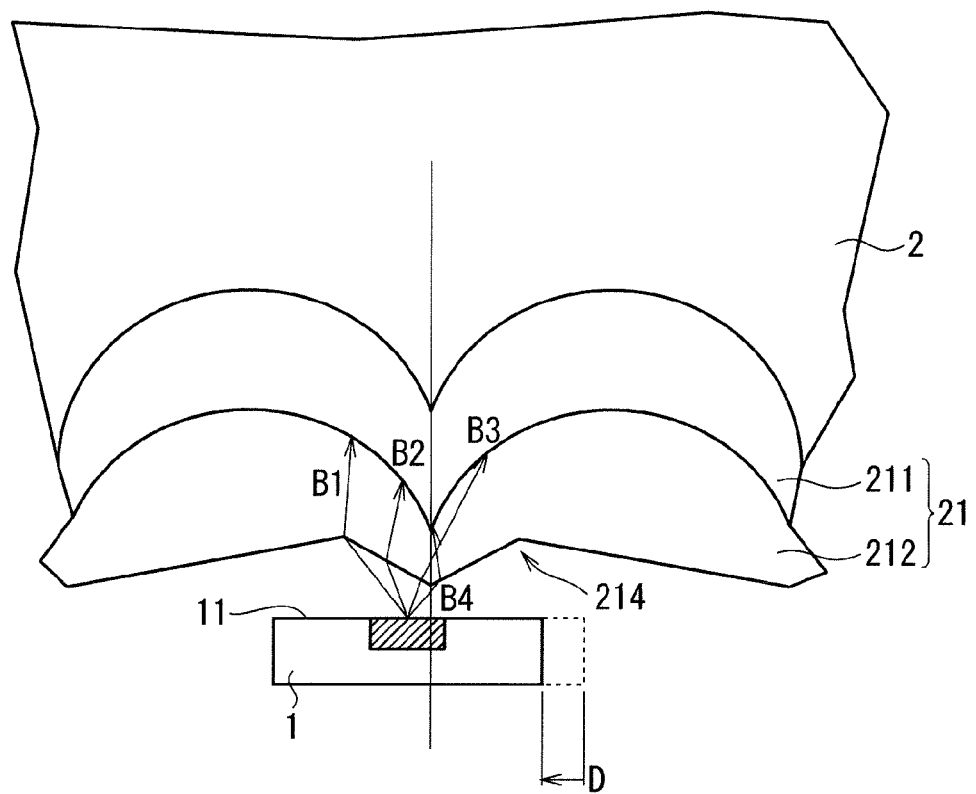

F I G. 1 4
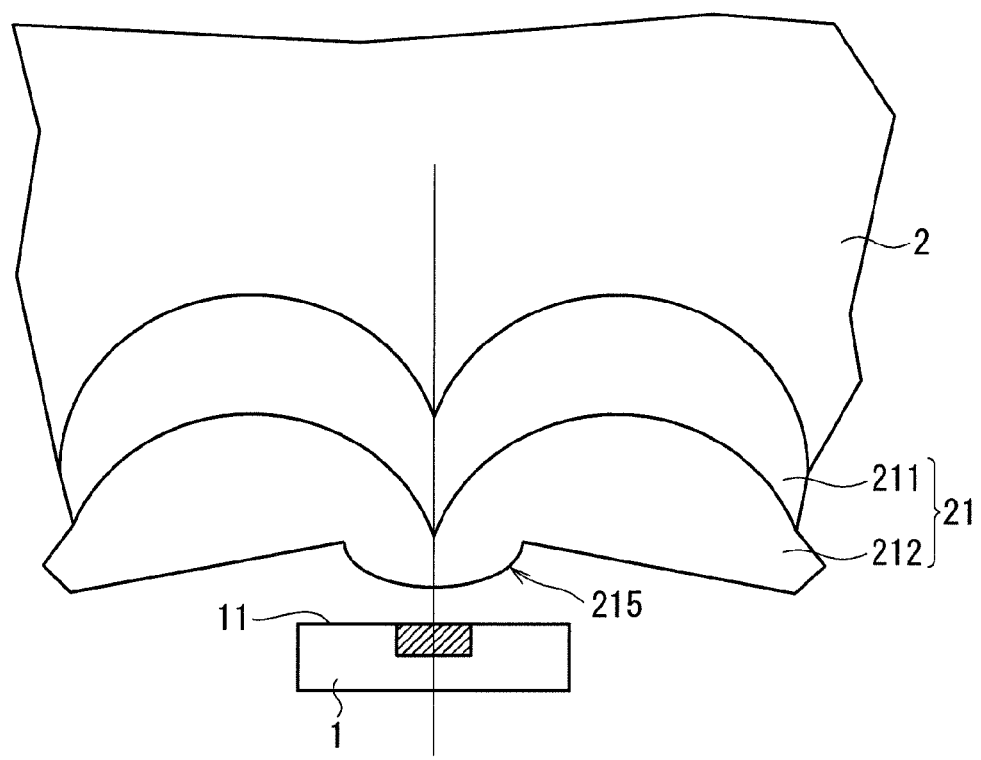

F I G. 1 5
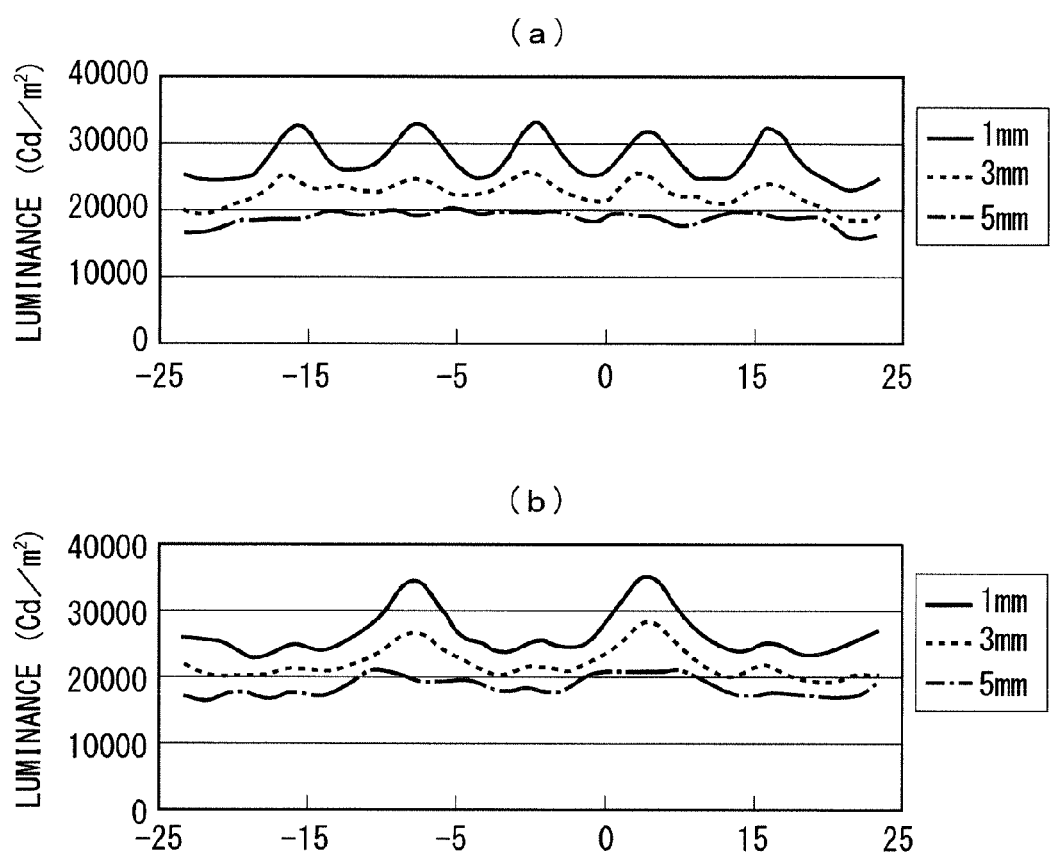

F I G. 1 6
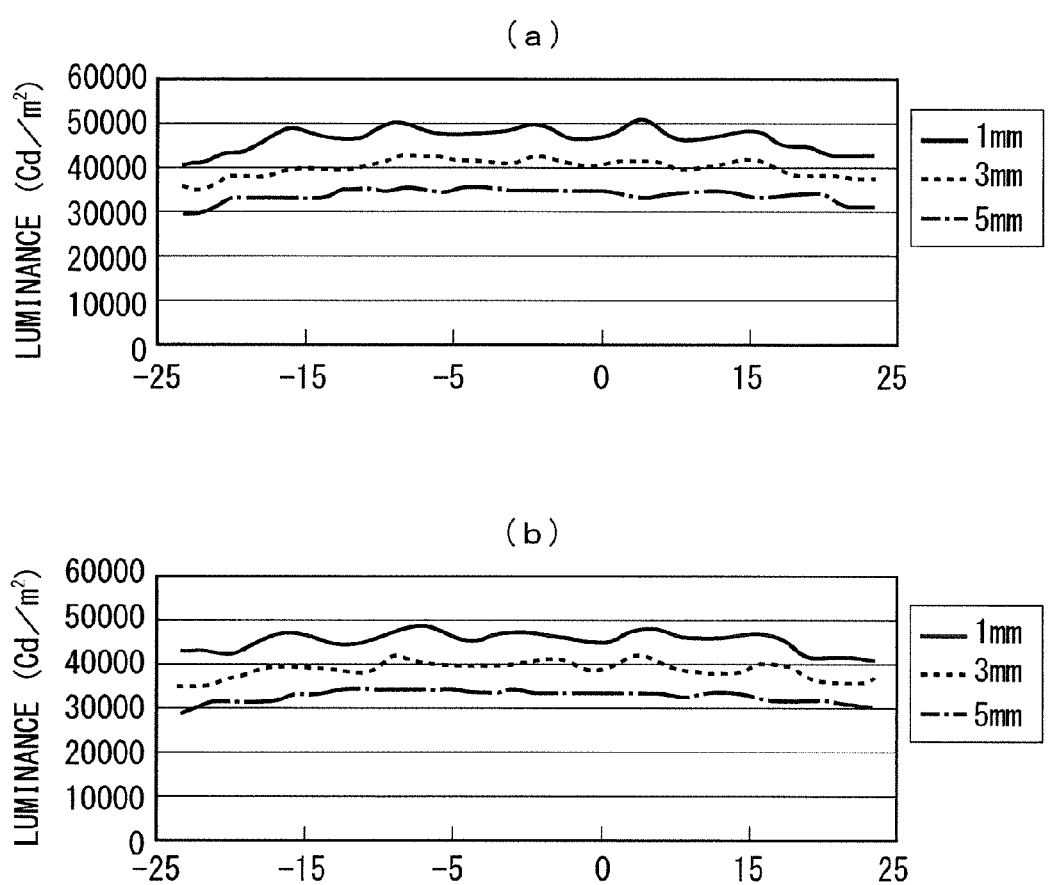

F I G. 1 7
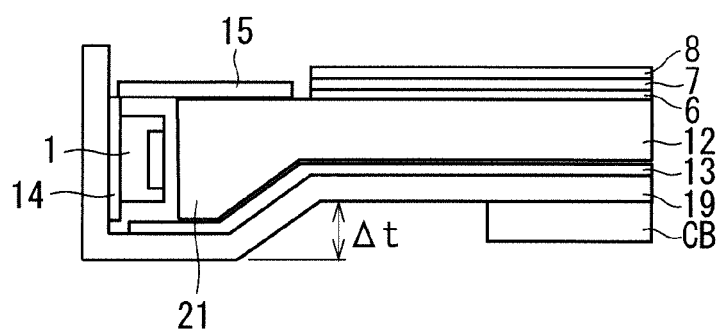

F I G. 1 8
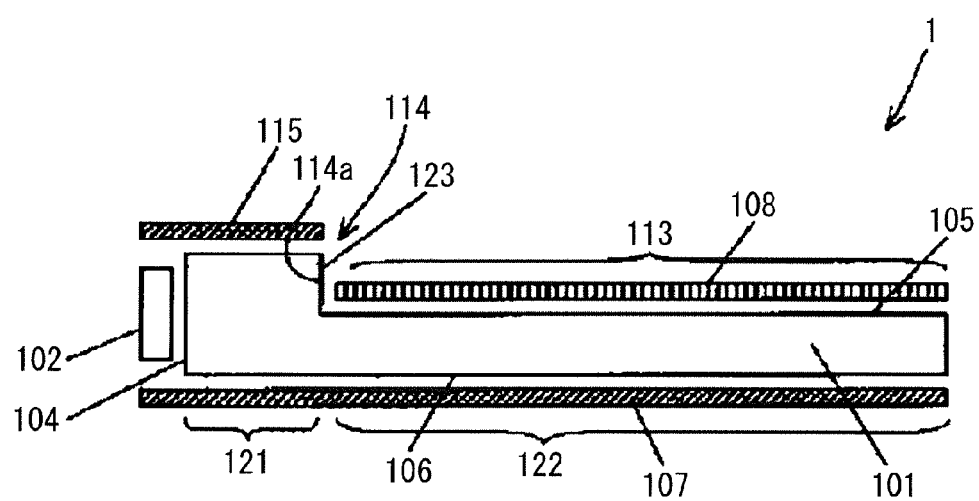

AREA LIGHT SOURCE DEVICE AND DISPLAY DEVICE USING SAME

TECHNICAL FIELD

The present invention relates to an area light source device and a display device using the area light source device. More particularly, the invention relates to an area light source device which is an edge light type lighting device having a light source at a light entrance end of a light guide plate to emit light from a light exit surface perpendicular to the light entrance end and which is suitable for a liquid crystal display device, a main lighting device, or a display device such as decorative lighting, advertisement display device or a guide light, and to a display device using the area light source device.

BACKGROUND ART

A non-light-emitting display device typified by a liquid crystal display device is provided with a lighting device for lighting on the back side thereof. A known example of this lighting device includes a light source such as an LED (Light Emitting Diode), a light guide plate having a side surface serving as a light entrance surface in opposed relation to the light source and receiving light from the light source at the side surface to emit light from a light exit surface, and a reflection sheet provided on the back side of the light guide plate and for returning the light passing through the back side again into the light guide plate. Over the light exit surface, a lens sheet for gathering light emitted from the light exit surface into a viewing angle, as needed, to improve luminance, and a diffuser panel for making the luminance uniform are provided in some lighting devices.

In recent years, there has been a demand for reduction in thickness of lighting devices with the reduction in device thickness, and there have been more cases in which a light guide plate thinner than a light source is in particular used. However, the use of a light guide plate thinner than a light source, such as a film light guide plate, causes the difference in thickness to bring about incidence losses in the form of a leak of light, resulting in the decrease in luminance.

According to the technique disclosed in Patent Document 1, for example, on the other hand, it has been contemplated to give shape to a light introduction portion of a thin light guide plate, thereby reducing the incidence losses.

Specifically, as shown in FIG. 18, a light guide plate 101 having a light source 102 and a step 114 is formed, and a metal reflection film or a dielectric reflection film is formed on a step surface 114*a*. A shape such as a sawtooth shape and a curved shape is given to the step surface. Thus, part of light propagating from the light source 102 through a light entrance region 104 of the light guide plate to the inside thereof and impinging upon the step surface 114*a* is reflected to reach the light entrance region 104 again. Part of the light having reached the light entrance region 104 is totally reflected depending on the incident angle thereof, and part thereof is partially reflected to propagate to the inside of the light guide plate 101.

PRIOR ART DOCUMENT

Patent Document

Patent Document 1: Japanese Patent Application Laid-Open No. 2003-272428

SUMMARY OF THE INVENTION

Problem to be Solved by the Invention

As described above, the conventional area light source devices, which use a special light reflection structure, necessitate the step of depositing a metal reflection film or a dielectric reflection film as a light reflection structure. This results in the increase in manufacturing costs. Also, there is a high probability that the reflection film cannot provide a reflectivity of 100%. After the reflected light travels to the outside of the light guide plate, an outside reflection plate causes the light to enter the light guide plate again. It is considered that this provides a low light collection rate.

The present invention has been made to solve the aforementioned problems. It is therefore an object of the present invention to provide an area light source device which uses a light guide plate thinner than the thickness of a point light source and which achieves the reduction in light losses during the incidence of light upon the light guide plate.

Means to Solve the Problem

An area light source device according to the present invention comprise: a point light source; and a light guide plate having a light entrance surface disposed in opposed relation to the point light source, and a light exit surface, the light guide plate receiving light from the point light source to propagate the light, the light guide plate including a protruding structure on the light entrance surface side, the protruding structure protruding from the light exit surface side or a counter light exit surface side opposite from the light exit surface, the point light source including an arrangement of point light sources, the protruding structure being configured such that oblique cylinders each having a semicircular upper surface protrude and arranged in a direction of the arrangement of the point light sources, the point light sources being arranged so that the lines of intersection of adjacent ones of the oblique cylinders coincide with the middles of the point light sources, respectively.

Effects of the Invention

The area light source device according to the present invention have a structure such that the protruding structure provided in a light guide plate light incoming part uses total reflection to deflect light, thereby guiding the light to a thin portion of the light guide plate. As a result, light losses are low.

These and other objects, features, aspects and advantages of the present invention will become more apparent from the following detailed description of the present invention when taken in conjunction with the accompanying drawings.

BRIEF DESCRIPTION OF DRAWINGS

FIG. 13 is a plan view of the light guide plate of the area light source device according to Embodiment 6 of the present invention.

FIG. 14 is a plan view of the light guide plate of the area light source device according to Embodiment 6 of the present invention.

FIG. 15 is a graph of a spatial luminance distribution according to Embodiment 6 of the present invention.

FIG. 16 is a graph of the spatial luminance distribution according to Embodiment 6 of the present invention.

FIG. 17 is a plan view of the light guide plate of the area light source device according to Embodiment 7 of the present invention.

FIG. 18 is a sectional view showing a structure of a conventional area light source device.

EMBODIMENTS FOR CARRYING OUT THE INVENTION

Embodiment 1

Figure 1:
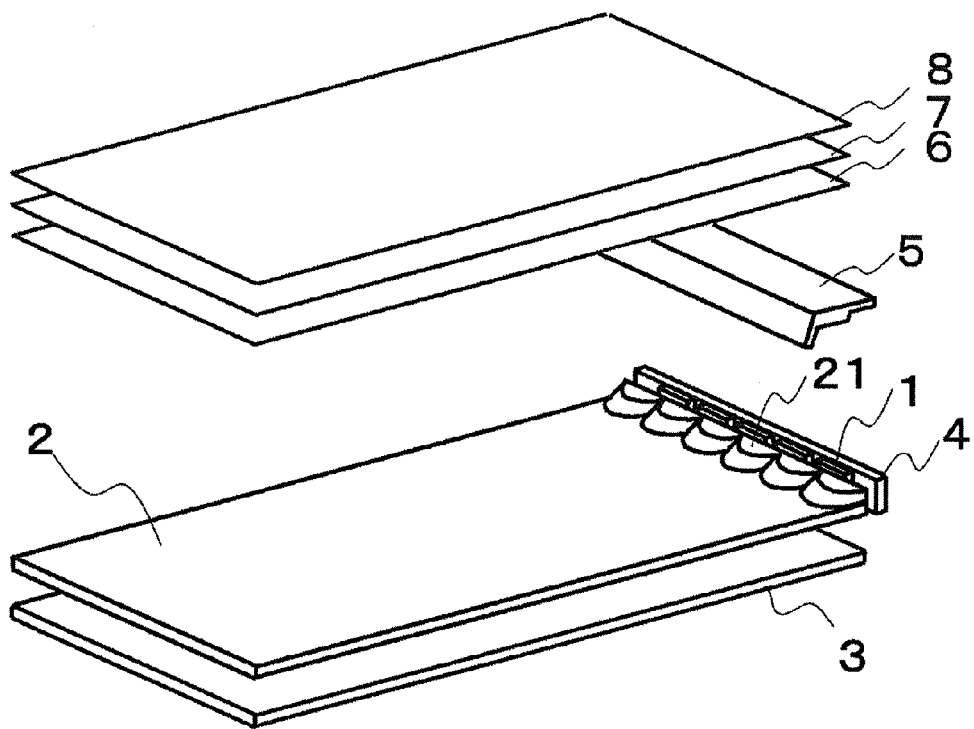
FIG. 1 is a perspective view of an area light source device according to Embodiment 1 of the present invention.

FIG. 1 is a perspective view of an area light source device according to Embodiment 1 of the present invention. As shown in FIG. 1, the area light source device includes point light sources 1 such as LEDs, and a light guide plate 2 for propagating light. The light guide plate 2 has a light entrance surface disposed in opposed relation to the point light sources 1, a light exit surface which emits light incident on the light entrance surface and propagated in the light guide plate 2, and a counter light exit surface which is a surface opposite from the light exit surface. A protruding structure 21 of a light guide plate light incoming part which protrudes from the light exit surface is provided on the light entrance surface side of the light guide plate 2 where the point light sources 1 are disposed.

The area light source device further includes a lower reflection plate 3 disposed on the counter light exit surface side, a side surface reflection plate 4 disposed on the back side of the point light sources 1, an upper reflection plate 5 covering the protruding structure 21 of the light guide plate light incoming part, a diffuser panel 6 disposed on the light exit surface side and for uniformly diffusing light, a longitudinal prism sheet 7 which gathers light beams to change the direction thereof, a transverse prism sheet 8, and the like.

The longitudinal prism sheet 7 includes triangular prisms with grooves extending in a direction orthogonal to the direction of the arrangement of the point light sources 1. The transverse prism sheet 8 includes triangular prisms with grooves extending in a direction orthogonal to the direction of the grooves of the triangular prisms of the longitudinal prism sheet 7.

Protruding shapes formed by screen printing or hemispherical recessed (or protruding) shapes referred to as grain are formed on the counter light exit surface side or the light exit surface side of the light guide plate 2. This causes light to go out of the light exit surface of the light guide plate 2 and to pass through the diffuser panel 6, the longitudinal prism sheet 7 and the transverse prism sheet 8, so that the light is emitted at a light distribution angle optimum for a front direction. A display device is formed by placing a display element such as a liquid crystal display panel at a position opposed to the light exit surface of the area light source device.

On the light entrance surface side of the light guide plate 2, the protruding structure 21 of the light guide plate light incoming part is formed in which light guide elements each having the shape of an oblique cylinder formed so as to be inclined toward the light entrance surface side with respect to the light exit surface are arranged in partially overlapping relation in the direction of the arrangement of the point light sources 1 and are then cut evenly at the light entrance surface of the light guide plate 2 perpendicularly to the counter light exit surface, thereby having a side surface opposed to the light entrance surface.

Figure 2:
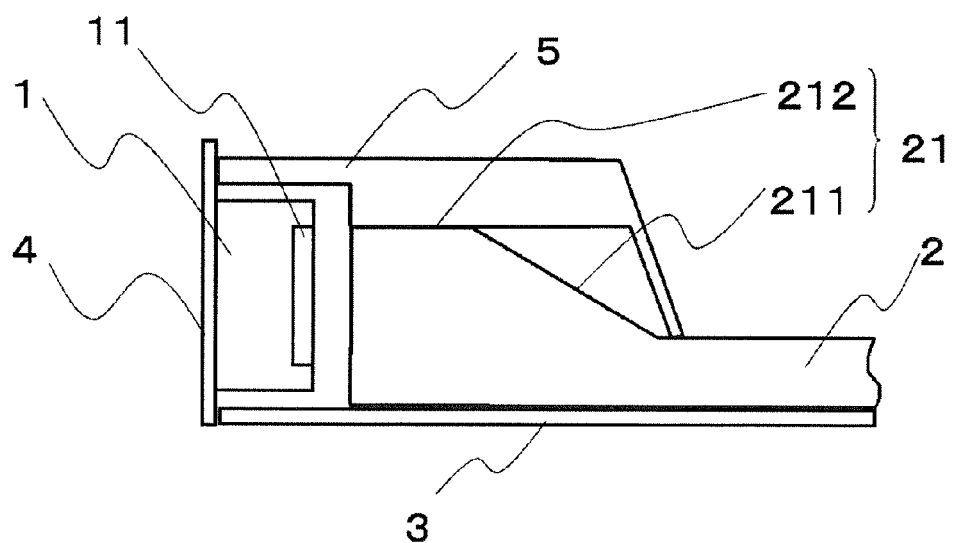
FIG. 2 is a plan view of a light incoming part of a light guide plate according to Embodiment 1 of the present invention.

A sectional view of the light guide plate light incoming part is shown in FIG. 2. In FIG. 2, oblique cylindrical surfaces of the protruding structure 21 of the light guide plate light incoming part are designated by 211, and semicircular horizontal surfaces serving as an upper surface of the protruding structure 21 of the light guide plate light incoming part and formed horizontally with respect to the light exit surface are designated by 212. The lower reflection plate 3, the side surface reflection plate 4 and the upper reflection plate 5, which are configured to cover the entire protruding structure 21 of the light guide plate light incoming part, are assembled so as to create as little clearance as possible particularly between the upper reflection plate 5 and the semicircular horizontal surfaces 212 of the protruding structure 21 of the light guide plate light incoming part. This is because light incoming from the semicircular horizontal surfaces 212 of the protruding structure 21 of the light guide plate light incoming part exits from the counter light exit surface of the light guide plate 2 and does not become light propagating in the light guide plate 2. The lower reflection plate 3, the side surface reflection plate 4 and the upper reflection plate 5 may be either regular reflection plates or diffuse reflection plates.

Clearance is created between the point light sources 1 and the light guide plate 2 to prevent the influence of the heat of the point light sources 1 from being exerted upon the light guide plate 2. It is preferable that the upper ends of light emitting surfaces 11 of the respective point light sources 1 are approximately level with or lower than the upper end of the protruding structure 21 of the light guide plate light incoming part.

Figure 3:
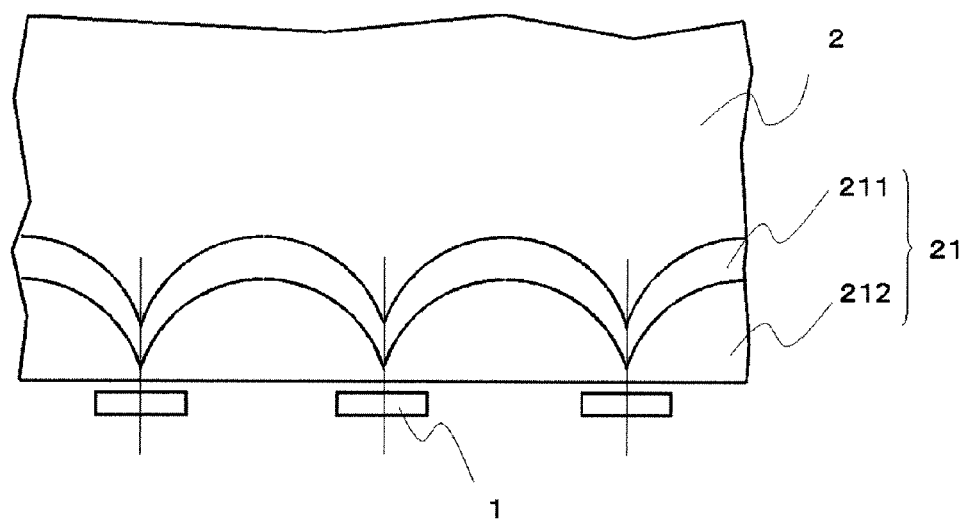
FIG. 3 is a sectional view of the light incoming part of the light guide plate according to Embodiment 1 of the present invention.

FIG. 3 is a plan view of the light guide plate light incoming part. As shown in FIG. 3, the point light sources 1 are arranged so that the lines of intersection of the oblique cylinders coincide with the middles of the respective point light sources 1. The manner in which light beams are reflected when the point light sources 1 and the protruding structure 21 of the light guide plate light incoming part are arranged in this manner will be described with reference to FIGS. 4 and 5.

Figure 4:
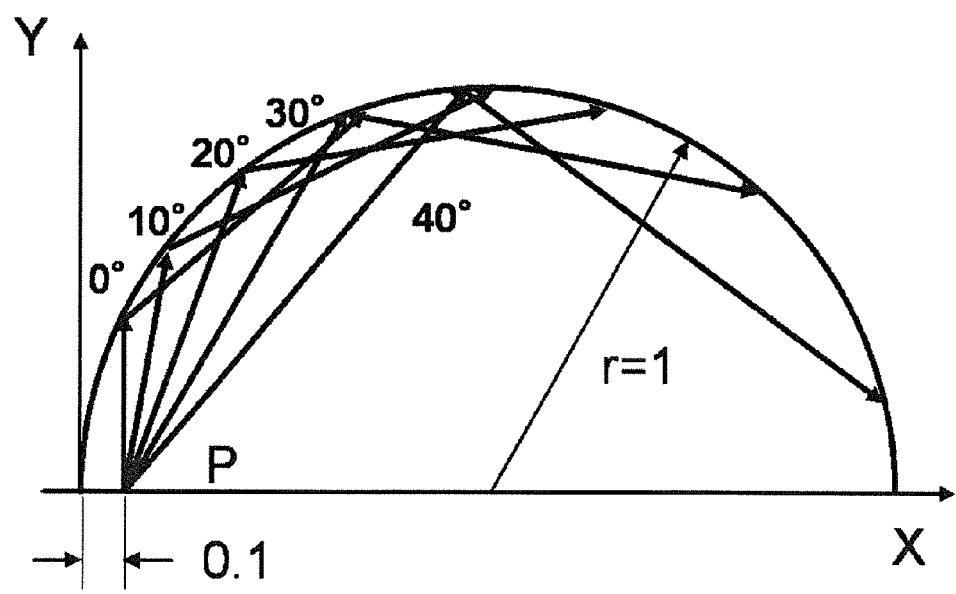
FIG. 4 is a sectional view of a semicylindrical part of the light guide plate according to Embodiment 1 of the present invention.
Figure 5:
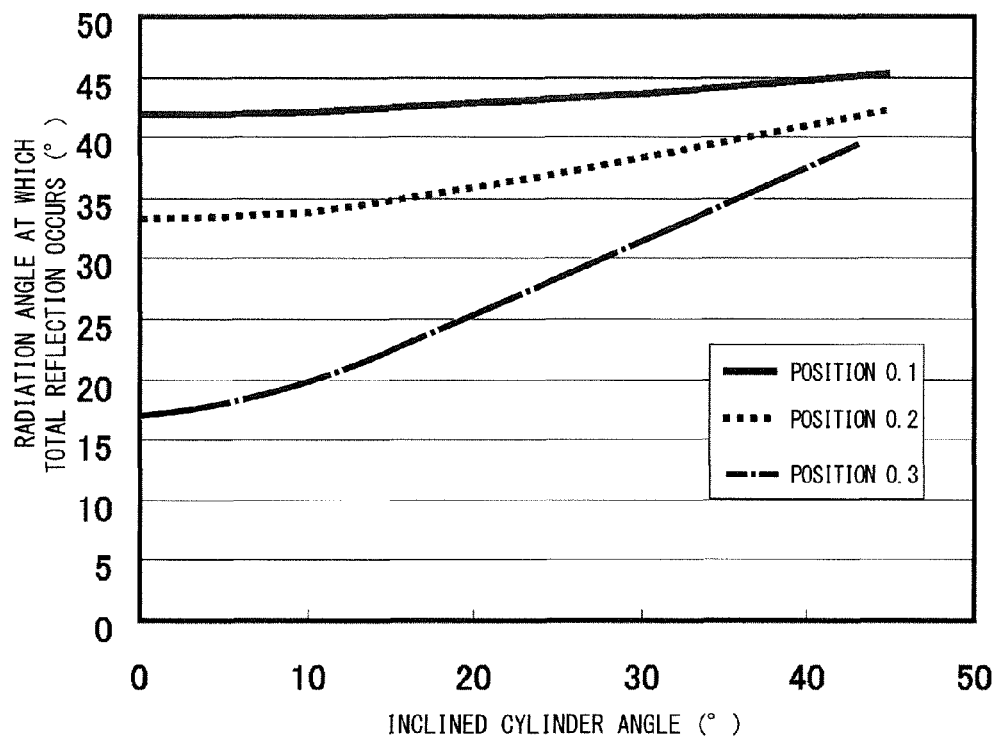
FIG. 5 is a graph showing correlation curves between the rotation angle of semicylinders of the light guide plate and a radiation angle at which total reflection from a cylindrical surface occurs.

FIG. 4 shows the manner in which light beams propagate while being totally reflected in a semicylinder obtained by cutting a cylinder made by a transparent light guide element in half. FIG. 5 shows a correlation between the inclined angle of rotation of the cylinder shown in FIG. 4 about an X axis and a radiation angle at which the total reflection occurs.

In FIG. 4, it is assumed that the semicylinder extends infinitely in the direction of the plane of the figure, and the X axis is defined in parallel with the cut surface of the cylinder whereas a Y axis is defined in a direction orthogonal to the X axis. Light beams radiated within the range of 0 to 40 degrees are all in the XY plane, and the radiation angle shall be an angle which the direction of the light beams forms with the Y axis. A radiation light source point P shown in FIG. 4 shall be a point on the X axis which is moved 0.1 in the X direction from the perimeter of a cylinder having a radius of 1. This shows a light beam immediately after being incident on the cut surface of the semicylinder from the outside. For example, when a material having a refractive index of 1.59 such as polycarbonate is used, the maximum angle of light incident on the light guide element is approximately 40°. That is, FIG. 4 shows the trajectory of light incident on the cut surface of the semicylinder made of such a high refractive index material. Light totally reflected at a point lying on a spherical surface is incident upon and reflected from a next spherical surface at the same angle, and is hence propagated while being totally reflected repeatedly. Thus, the figure shows that incident light is totally reflected from a cylindrical surface.

In FIG. 5, the horizontal axis represents the inclined angle of rotation of the cylinder about the X axis, and the vertical axis represents the radiation angle at which the total reflection from the cylindrical surface occurs. The condition of FIG. 4 is the point with an inclined cylinder angle of 0° on the solid line in FIG. 5, and the maximum radiation angle at which the total reflection occurs is 42°. It is hence found that all of the light beams with radiation angles of not more than 40° shown in FIG. 4 are totally reflected. It is found from FIG. 5 that the maximum radiation angle at which the total reflection occurs increases with the increase in the inclined cylinder angle. In particular, when the incident light source position is moved 0.2 and 0.3 in the X direction from the perimeter of the cylinder (indicated by a dotted line and a dot-and-dash line), this becomes more pronounced in accordance with the magnitude of the distance of movement.

Point light sources such as LEDs in practical use have a finite size, and it is preferable that the width of the light beams to be totally reflected is greater. It is hence preferable that the condition that the radiation angle at which the total reflection occurs is 40° for the light from 0.3 that is greater in the distance of movement in the X direction from the perimeter of the cylinder, that is, the inclined cylinder angle is not less than 45°.

In the present study, polycarbonate is taken as an example of the light guide plate material. Instead, transparent resins such as polymethyl methacrylate (PMMA), acrylic resin and cycloolefin-based material are also applicable.

In the area light source device according to the present invention, light from the point light sources 1 is incident on the light entrance surface of the light guide plate 2, and is then totally reflected along the cylindrical surfaces 211 constituting the protruding structure 21 of the light guide plate light incoming part. The totally reflected light is refracted at the counter light exit surface, and is radiated and propagated to the entire light guide plate 2. Then, area light is formed and emitted from the light exit surface by the protruding shapes formed by screen printing or grain which are formed at the light exit surface or the counter light exit surface.

In the case where the light guide plate thinner than the thickness of the point light sources 1 is used in this manner, the protruding structure 21 of the light guide plate light incoming part is provided on the light entrance surface side, and the point light sources 1 are arranged so that the lines of intersection of the oblique cylinders constituting the protruding structure 21 coincide with the middles of the respective point light sources 1. Thus, incident light is totally reflected and propagated along the cylindrical surfaces 211, and area light with low light losses is emitted from the light exit surface of the light guide plate 2. This provides a thin area light source device which is high in incidence efficiency and high in light utilization efficiency.

Embodiment 2

Figure 6:
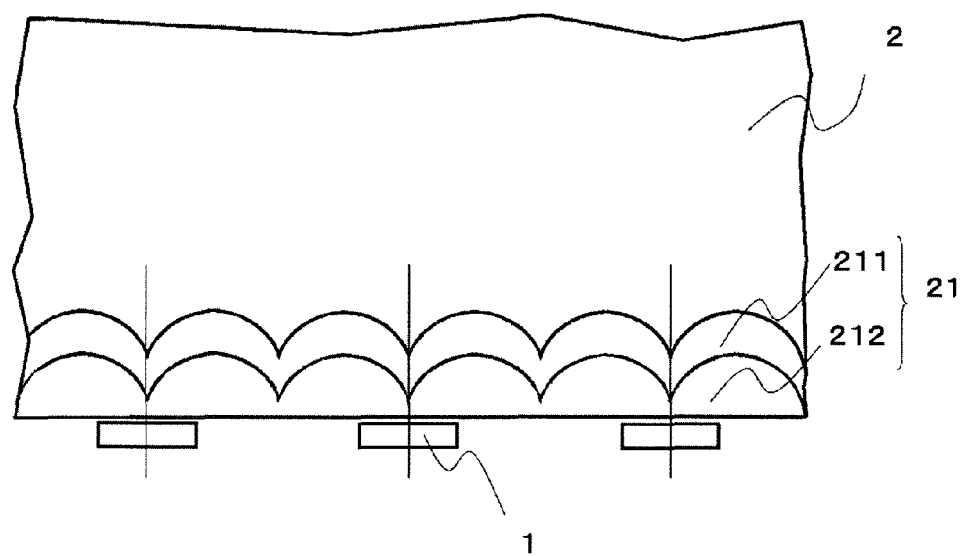
FIG. 6 is a plan view of the light guide plate light incoming part of the area light source device according to Embodiment 2 of the present invention.

FIG. 6 is a plan view of the light guide plate light incoming part of the area light source device according to Embodiment 2 of the present invention. While the arrangement cycle of the oblique cylinders coincides with the arrangement cycle of the point light sources 1 in Embodiment 1, the arrangement cycle of the oblique cylinders is twice the arrangement cycle of the point light sources 1 in Embodiment 2.

By doubling the arrangement cycle of the oblique cylinders, the width of the protruding structure 21 of the light guide plate light incoming part is reduced. That is, the distance from the light entrance surface of the light guide plate 2 to an area having a thin light guide plate where uniform light emission is achieved is shortened, so that the bezel width is reduced as a display device.

Based on such a principle, the bezel width is further reduced by providing the arrangement cycle of the oblique cylinders which is an integral multiple of, e.g. three or four times, the arrangement cycle of the point light sources 1. The extent to which the bezel width is reduced is determined from machining limitations of the actual dimensions of the actual oblique cylinders.

Embodiment 3

Figure 7:
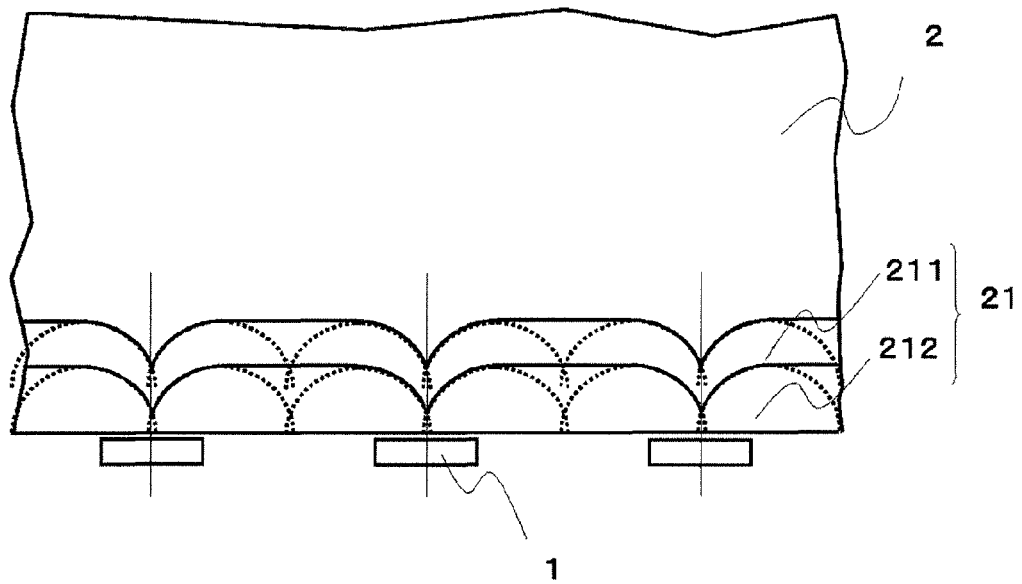
FIG. 7 is a plan view of the light guide plate light incoming part of the area light source device according to Embodiment 3 of the present invention.

FIG. 7 is a plan view of the light guide plate light incoming part of the area light source device according to Embodiment 3 of the present invention. In the figure, dotted lines denote the position of the oblique cylinders of Embodiment 2.

While the oblique cylinders are arranged in the light guide plate light incoming part in Embodiment 2, the lines of intersection of the oblique cylinders may be disposed in the middle positions of the respective point light sources 1. Specifically, this structure is such that the lines of intersection are formed by parts of the upper surfaces of the oblique cylinders which correspond to quadrants (quarter-circles), as shown in FIG. 7. Between the point light sources 1, a portion lying between the tops of the quadrants of the oblique cylinders is configured to be flat, and the flat portion shall be an inclined surface at the same angle as the oblique cylindrical surfaces. That is, the protruding structure 21 of the light guide plate light incoming part in Embodiment 3 is configured such that the oblique cylinders each having an upper surface having the shape of a quadrant are disposed on opposite ends, and such that contiguous oblique cylinders each having a flat inclined surface at the same angle as the oblique cylinders are arranged in the direction of the arrangement of the point light sources 1 and protrude between the oblique cylinders each having the shape of the quadrant.

Such a configuration allows the total reflection of light which becomes transmitted light, as compared with Embodiments 1 and 2 in which the oblique cylinders are formed into semicircles.

Only the provision of the quadrant which is part of each of the semicircles of the oblique cylinders and which forms the line of intersection of the oblique cylindrical surfaces allows light to be totally reflected and guided into the light guide plate 2. Because there is a likelihood that the remaining quadrant cannot totally reflect light incident from an end of a light source having a finite width, it is preferable that the inclined surface is formed by a surface parallel to the light entrance surface.

It is preferable to reduce unevenness in the process using injection molding from the viewpoint of providing better charging of resin. On the other hand, the shape of Embodiment 2, which simply includes only the cyclic arrangement of the oblique cylinders, has the advantage of facilitating die machining.

Embodiment 4

Figure 8:
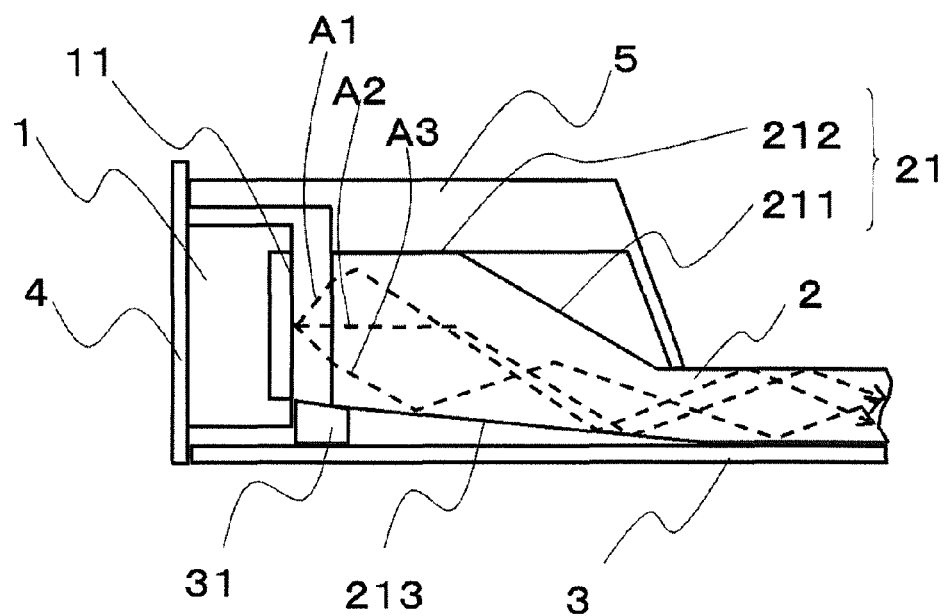
FIG. 8 is a sectional view of the light guide plate light incoming part of the area light source device according to Embodiment 4 of the present invention.

FIG. 8 is a sectional view of the light guide plate light incoming part of the area light source device according to Embodiment 4. Embodiment 4 is characterized in that an inclined surface 213 constant in the depth direction of the plane of the figure is formed on the counter light exit surface side of the protruding structure 21 of the light guide plate light incoming part in addition to the oblique cylindrical structure of the light guide plate light incoming upper part described in Embodiments 1, 2 and 3. Also, a reflection plate 31 is disposed on the counter light exit surface side of the protruding structure 21 of the light guide plate light incoming part in addition to the lower reflection plate 3. When the reflection plate 31 is absent on the counter light exit surface side of the protruding structure 21 of the light guide plate light incoming part, light reflected from the lower reflection plate 3 travels into the light guide plate from the inclined surface 213 formed on the counter light exit surface side of the protruding structure 21 of the light guide plate light incoming part and is transmitted through the inclined oblique cylindrical surfaces 211 of the protruding structure 21. Thus, this light does not become effective propagated light. To eliminate such a light beam path, the reflection plate 31 is provided on the counter light exit surface side of the protruding structure 21 of the light guide plate light incoming part.

In FIG. 8, three arrowed lines A1, A2 and A3 denote trajectories of light incident from point light sources upon near the lines of intersection of the oblique cylinders. The arrowed lines A1, A2 and A3 are on a plane which is the same as the plane of the figure, and are the trajectories of light radiated from the vertically middle position of a point light source 1 in angular directions of +50°, 0° and −50°, respectively, with respect to the horizontal line of the figure.

The light beam A1 radiated in the +50° direction from a point light source 1 is incident on the light entrance surface of the light guide plate 2, and is then totally reflected from a corresponding one of the oblique cylindrical surfaces 211. Thereafter, the light beam A1 is totally reflected from the inclined surface 213 formed on the counter light exit surface side of the protruding structure 21 of the light guide plate light incoming part, and is propagated as totally reflected to a thin body portion of the light guide plate 2. Because of the presence of the inclined surface 213 formed on the counter light exit surface side of the protruding structure 21 of the light guide plate light incoming part, the light beam is propagated at an angle close to the horizontal. The light beam A2 radiated in the 0° direction behaves in a similar manner.

The light beam A3 radiated in the −50° direction is incident on the light entrance surface of the light guide plate 2, and is then totally reflected from the inclined surface 213 formed on the counter light exit surface side of the protruding structure 21 of the light guide plate light incoming part. Thereafter, the light beam A3 is totally reflected from a horizontal surface formed downstream of the lines of intersection of the oblique cylinders, and is propagated as totally reflected to the thin body portion of the light guide plate 2. As compared with the light beams A1 and A2, the light beam A3 has the problem that the position of reflection from the light guide plate counter light exit surface is positioned upstream. Depending on the light incident position, there are cases where the light beam A3 impinges upon the oblique cylindrical surface 211 after being reflected from the light guide plate counter light exit surface.

In such a case, the light beam cannot be totally reflected because the incident angle upon a surface is less than the critical angle. To prevent this, the inclined surface 213 is provided on the counter light exit surface side of the protruding structure 21 of the light guide plate light incoming part to direct the light beam as close to the horizontal as possible, thereby facilitating the propagation to the thin body portion of the light guide plate 2.

Figure 9:
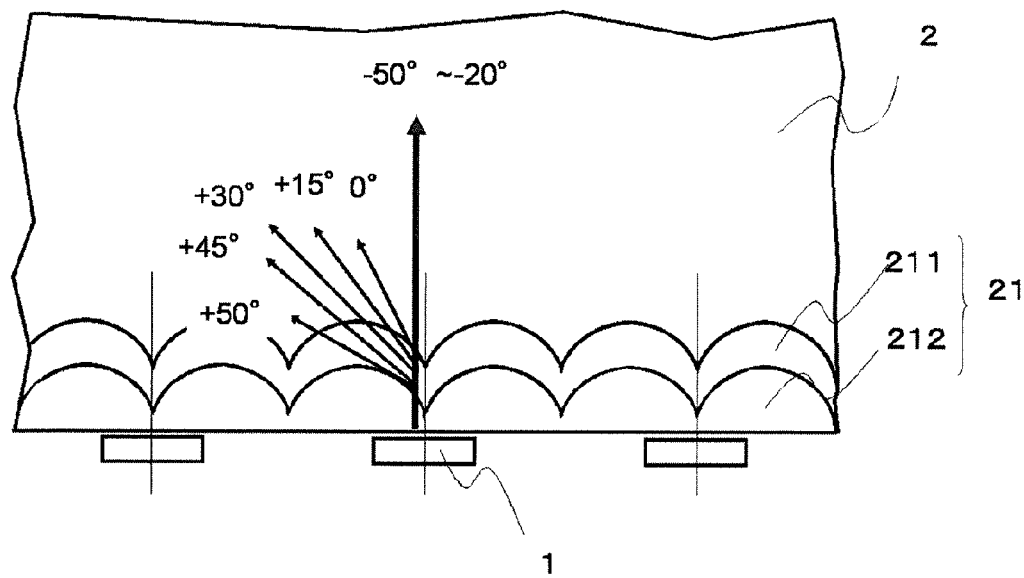
FIG. 9 is a plan view of the light guide plate light incoming part of the area light source device according to Embodiment 4 of the present invention.

Another effect of the protruding structure 21 of the light guide plate light incoming part will be described with reference to FIG. 9. FIG. 9 is a plan view of the light guide plate light incoming part of the area light source device according to the present embodiment. The arrows in the figure indicate the trajectories of the aforementioned light beams A1 to A3 and light beams having other radiation angles in plan view.

As seen in the direction of the plan view, all of the light beams appear to be incident perpendicularly upon the light entrance surface of the light guide plate 2. The light beam in the +50° direction is totally reflected from an oblique cylindrical surface 211, and then turns 60° to propagate into the light guide plate 2. As the angle approaches the horizontal in steps of 15° such as +45°, +30°, +15° and 0° in order, the position of reflection of the light beams from the oblique cylindrical surface 211 is shifted downstream at equal intervals. In accordance with the incident angles thereof, the light beams change their directions so that the deflection angle in the horizontal direction decreases, and travel in the light guide plate. Light beams in −50° to −20° directions which do not impinge upon the surface-inclined oblique cylindrical surface 211 after incident upon the light guide plate 2 travel perpendicularly to the light entrance surface of the light guide plate 2 without changing the directions.

In this manner, the protruding structure 21 of the light guide plate light incoming part has the function of causing the spread of light in a vertical plane to spread in a horizontal plane. Thus, unevenness in luminance in a light incoming part as seen in a typical edge light system using LEDs as point light sources is less prone to occur.

Embodiment 5

Figure 10:
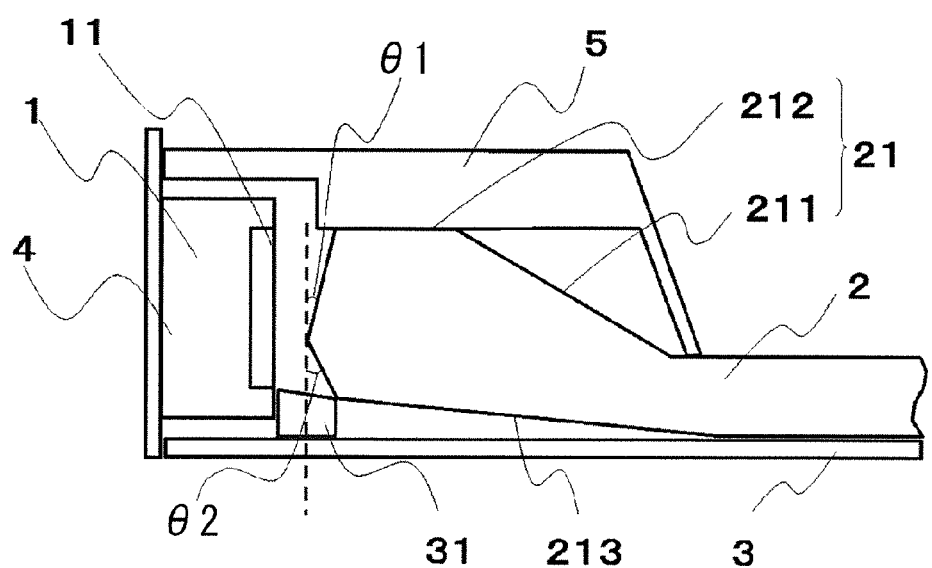
FIG. 10 is a sectional view of the light guide plate of the area light source device according to Embodiment 5 of the present invention.

FIG. 10 is a sectional view of the light guide plate of the area light source device according to Embodiment 5. The present embodiment is characterized by a point at which division is made into two: the angle of inclination on the light exit surface side and the angle of inclination on the counter light exit surface (division is made into two regions) with respect to the light entrance surface of the light guide plate according to Embodiment 4. The angle of inclination on the light exit surface side is referred to as a light entrance surface upper portion inclination angle θ1, and the angle of inclination on the counter light exit surface is referred to as a light entrance surface lower portion inclination angle θ2.

The major part of light incident on the light exit surface side of the light guide plate light entrance surface impinges upon the oblique cylinders after being incident thereon. The major part of light incident on the counter light exit surface side of the light guide plate light entrance surface impinges upon the inclined surface of the lower portion of the light entrance surface after being incident thereon. Thus, the provision of the separate incident inclination angles on the light exit surface side and on the counter light exit surface side maximizes the incidence efficiency. It is preferable that the light entrance surface upper portion inclination angle θ1 is in the range of 0° to 25°, and the light entrance surface lower portion inclination angle θ2 is in the range of 0° to 10°.

Embodiment 6

Figure 11:
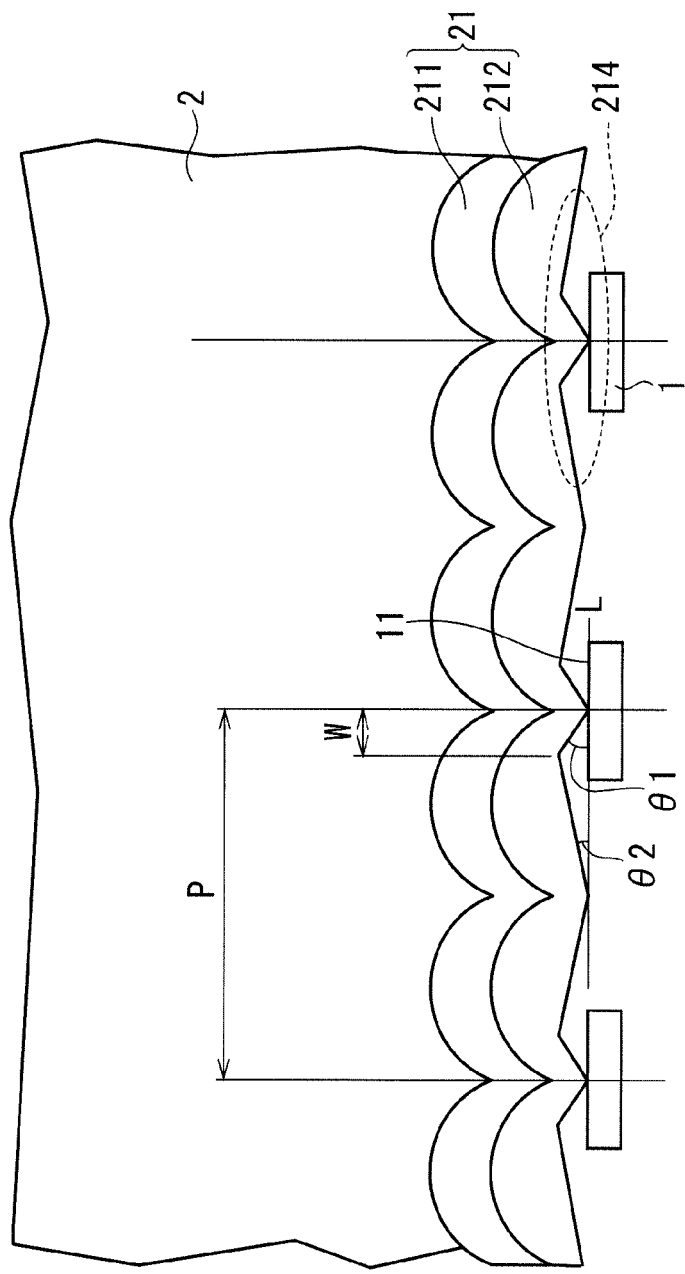
FIG. 11 is a plan view of the light guide plate of the area light source device according to Embodiment 6 of the present invention.

FIG. 11 is a plan view of the light guide plate light incoming part of the area light source device according to Embodiment 6. Embodiment 6 is characterized in that M-shaped parts 214 are formed on the light guide plate light incoming surface side in addition to the oblique cylindrical structure of the light guide plate light incoming upper part described in Embodiments 1, 2 and 3.

The provision of such a shape achieves an area light source which does not significantly impair a spatial luminance distribution near the light guide plate light incoming part if misregistration between the point light sources and the light guide plate occurs during assembly.

With reference to FIG. 11, protruding portions which protrude toward the point light sources 1 are provided at positions of the light entrance surface of the light guide plate 2 in opposed relation to the point light sources 1 and between adjacent ones of the point light sources 1, so that the M-shaped parts 214 which are of an M-shaped configuration as seen in plan view are provided. The protruding portions opposed to the point light sources 1 shall be inside inclined surfaces, and the protruding portions between the point light sources 1 shall be outside inclined surfaces. An instance in which the arrangement cycle of the oblique cylinders of the protruding structure 21 is twice the arrangement cycle of the point light sources 1 is illustrated in FIG. 11.

The angle of the inside inclined surfaces of the M-shaped parts 214 with respect to a line L parallel to the light emitting surfaces 11 of the point light sources 1 is designated by θ1, and the angle of the outside inclined surfaces thereof is designated by θ2. A distance between the point light sources is designated by P, and the width of the inside inclined surfaces is designated by W. Then, a relationship in Mathematical Expression (1) below holds.

[Math. 1]

$$W\tan\theta1 = \left(\frac{P}{2} - W\right)\tan\theta2 \qquad (1)$$

Figure 12:
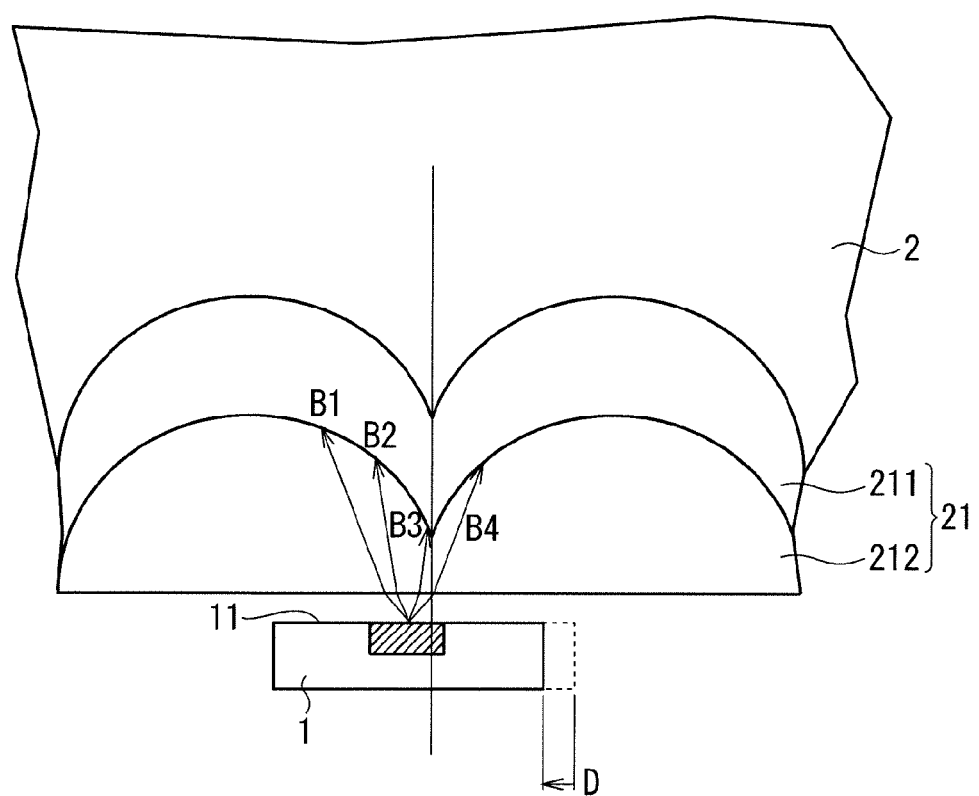
FIG. 12 is a plan view of the light guide plate for illustration according to Embodiment 6 of the present invention.

Next, the operation of the M-shaped parts 214 will be described with reference to FIGS. 12 and 13. FIG. 12 is a plan view of the light guide plate light incoming part in which there is no M-shaped part 214 at the light guide plate light incoming surface. FIG. 13 is a plan view of the light guide plate light incoming part in which there is an M-shaped part 214 at the light guide plate light incoming surface. The middle of the point light source in FIGS. 12 and 13 does not lie on the same line as the part of the line of intersection of the inclined cylinders of the protruding structure, but is deviated a distance D leftwardly therefrom. Trajectories of light beams B1 to B4 radiated uniformly from the light emitting surface 11 of the point light source until impingement thereof upon the cylindrical surfaces in such a case are denoted by arrows in the figure.

Of the four light beams radiated from the light emitting surface 11 of the point light source with reference to FIG. 12, light beams B1 to B3 impinge upon the inclined cylindrical surface of the left-hand protruding structure, and only light beam B4 impinges upon the inclined cylindrical surface of the right-hand protruding structure. The light beams incident on the cylindrical surfaces travel along the arc as shown in FIG. 4. Thus, when the light incoming surface is planar, more light beams are emitted from the left-hand side toward which the point light source is deviated.

On the other hand, the formation of the M-shaped parts 214 on the light guide plate light incoming surface side as shown in FIG. 13 has the effect of bending the light beams to deflect the light beams in the direction of the line of intersection of the cylinders. As a result, this allows light beams B1 and B2 to impinge upon the inclined cylindrical surface of the left-hand protruding structure, and allows light beams B3 and B4 to impinge upon the inclined cylindrical surface of the right-hand protruding structure. The light beams impinging upon the cylindrical surfaces travel directly along the arc, and are emitted uniformly leftwardly and rightwardly.

The width W of the inside inclined surface of the M-shaped part 214 shall be defined by adding the amount of misregistration produced by assembly to the half width of the light emitting surface, and the angle θ1 of the inside inclined surface of the M-shaped part 214 is only required to be not less than 20°. Also, the angle θ2 of the outside inclined surface is only required to be not more than an angle uniquely determined by the spacing P of the point light sources from Mathematical Expression (1) after the determination of W and θ1. The term "not more than" means that 0° may be included. In this case, the configuration is not M-shaped but is a V-shaped protruding configuration.

In the case of conventional light sources using LEDs, the uniform brightness in the light emitting surface is not obtained, but LED chip portions are brighter. Although the width W is defined as the width of the light emitting surface of the point light source, the width of a high-luminance area may be designated by W in the case where there is a luminance distribution in the light emitting surface. By defining W as the width of part of the light emitting surface in this manner, W tan θ1 is made smaller, so that the bezel width is made smaller.

The shape of the light guide plate light incoming part need not necessarily be the M-shaped part 214. An arcuate part 215 having a curved protruding portion which protrudes in opposed relation to the point light source 1 as shown in FIG. 14 produces similar effects.

In this case, it is preferable that the inclination angle in the middle portion is small whereas the inclination angle in end portions is large. This is because, in the case where light emitted from the light emitting surface is uniform, there are no changes in the amount of light incident from the middle portion of the arcuate shape upon the light guide plate even if misregistration of the point light source occurs. In this case, whether light incident from the end portions of the light emitting surface impinges uniformly on the inclined cylindrical surfaces of the left-hand and right-hand protruding structures or not becomes a problem. It is important that light incident from the end portions of the light emitting surface is deflected greatly toward the line of intersection of the cylinders.

The effect of making the spatial luminance of the light guide plate having the M-shaped parts 214 uniform will be described with reference to FIGS. 15 and 16. A distribution of spatial luminance (Cd/m$^2$) in the direction of the arrangement of the point light sources in the case where the light guide plate light incoming surface has no M-shaped parts 214 and the point light sources are normally arranged is shown in a portion (a) of FIG. 15. A spatial luminance distribution in the direction of the arrangement of the point light sources in the case where the light guide plate light incoming surface has no M-shaped parts 214 and maximum misregistration of adjacent ones of the point light sources occurs in opposite directions is shown in a portion (b) of FIG. 15.

A spatial luminance distribution in the direction of the arrangement of the point light sources in the case where the light guide plate light incoming surface has the M-shaped parts 214 and the point light sources are normally arranged is shown in a portion (a) of FIG. 16. A spatial luminance distribution in the direction of the arrangement of the point light sources in the case where the light guide plate light incoming surface has the M-shaped parts 214 and maximum misregistration of adjacent ones of the point light sources occurs in opposite directions is shown in a portion (b) of FIG. 16.

In FIGS. 15 and 16, six point light sources (at ±4 mm, ±12 mm and ±20 mm positions) are arranged symmetrically, and spatial luminance distributions at 1 mm, 3 mm and 5 mm apart from an upstream portion of the light emission area in the direction of the arrangement of the point light sources are shown.

In the case where the light guide plate light incoming surface has no M-shaped parts 214 and the point light sources are normally arranged, the spatial luminance distributions such that regions between the point light sources are bright are obtained, as shown in the portion (a) of FIG. 15. If the misregistration of adjacent ones of the point light sources occurs in opposite directions, the luminance at the positions (±8 mm) where misregistration occurs in such a manner that the point light sources approach each other becomes conspicuously high, as shown in the portion (b) of FIG. 15.

On the other hand, in the case where the light guide plate light incoming surface has the M-shaped parts 214 and the point light sources are normally arranged, the regions between the point light sources are bright, but the amplitude of the luminance is smaller than that obtained in the case where the light guide plate light incoming surface has no M-shaped parts 214, as shown in the portion (a) of FIG. 16. If the misregistration of adjacent ones of the point light sources occurs in opposite directions, variations in the amplitude of the luminance are small, as shown in the portion (b) of FIG. 16. Thus, the spatial luminance distributions are little influenced by the misregistration.

Embodiment 7

FIG. 17 is a sectional view of the light guide plate of the area light source device according to Embodiment 7. As shown in FIG. 17, Embodiment 7 is such that the configuration of the light guide plate of Embodiments 1 to 6 is turned upside down, so that the positions of the light exit surface and the counter light exit surface are exchanged. The same reference numerals and characters are used to designate components identical with those of the area light source device of Embodiments 1 to 6, and repetition in description is dispensed with.

With reference to FIG. 17, a light guide plate 12 has a light entrance surface disposed in opposed relation to the point light sources 1, a light exit surface which emits light incident on the light entrance surface and propagated in the light guide plate 12, and a counter light exit surface which is a surface opposite from the light exit surface. The protruding structure 21 of the light guide plate light incoming part which protrudes from the counter light exit surface is provided on the light entrance surface side of the light guide plate 12 where the point light sources 1 are disposed.

The area light source device further includes a lower reflection plate 13 disposed on the counter light exit surface side, a side surface reflection plate 14 disposed on the back side of the point light sources 1, a rear cover 19 covering the counter light exit surface side and the side surface where the point light sources 1 are disposed, an upper reflection plate 15 covering the protruding structure 21 of the light guide plate light incoming part, the diffuser panel 6 disposed on the light exit surface side and for uniformly diffusing light, the longitudinal prism sheet 7 which gathers light beams to change the direction thereof, the transverse prism sheet 8, and the like.

In the area light source device shown in FIG. 17, a structure including a separate member such as a circuit board CB, for example, may be provided on the back surface side (counter light exit surface side) of the light guide plate 12. That is, by using a difference Δt between the thickness of the light entrance portion of the light guide plate 12 and the thickness of the light emitting portion, the separate member such as the circuit board CB may be disposed on the back surface side of the light guide plate 12. This enhances the design flexibility of the light emitting surface side of the area light source device.

Also, a display device is formed by disposing a display element such as a liquid crystal display panel at a position opposed to the light exit surface of the area light source device according to Embodiments 1 to 7 described above.

This display device is a display device producing the effects of the area light source device according to Embodiments 1 to 7.

While the invention has been described in detail, the foregoing description is in all aspects illustrative and not restrictive. It is understood that numerous other modifications and variations not illustrated can be devised without departing from the scope of the invention.

The invention claimed is:

1. An area light source device comprising:
   a point light source; and
   a light guide plate having a light entrance surface disposed in opposed relation to said point light source, and a light exit surface, the light guide plate receiving light from said point light source to propagate the light,
   said light guide plate including a protruding structure on said light entrance surface side, the protruding structure protruding from said light exit surface side or a counter light exit surface side opposite from said light exit surface,
   said point light source including an arrangement of point light sources,
   said protruding structure being configured such that oblique cylinders each having semicircular upper and lower surfaces protrude and are arranged in a direction of the arrangement of said point light sources, the upper and lower surfaces being congruent to each other,
   said point light sources being arranged so that the lines of intersection of adjacent ones of said oblique cylinders coincide with the middles of said point light sources, respectively.

2. The area light source device according to claim 1, wherein
   in said protruding structure, the arrangement cycle of said oblique cylinders is greater than and an integral multiple of the arrangement cycle of said point light sources.

3. An area light source device comprising:
   a point light source; and
   a light guide plate having a light entrance surface disposed in opposed relation to said point light source, and a light exit surface, the light guide plate receiving light from said point light source to propagate the light,
   said light guide plate including a protruding structure on said light entrance surface side, the protruding structure protruding from said light exit surface side or a counter light exit surface side opposite from said light exit surface,
   said point light source including an arrangement of point light sources,
   said protruding structure being configured such that oblique cylinders each having upper and lower surfaces each having the shape of a quadrant are disposed in parallel with each other to form opposite ends of said protruding structure and such that contiguous oblique cylinders each having a flat inclined surface at the same angle as said oblique cylinders are arranged in the direction of the arrangement of said point light sources and protrude between the oblique cylinders each having the shape of said quadrant, the upper and lower surfaces being congruent to each other,
   said point light sources being arranged so that the lines of intersection of adjacent ones of said oblique cylinders coincide with the middles of said point light sources, respectively.

4. The area light source device according to claim 1, wherein
   said light guide plate has an inclined surface at a constant angle on said light exit surface or said counter light exit surface opposite from the side from which said protruding structure protrudes.

5. The area light source device according to claim 4, wherein
   said light entrance surface of said light guide plate has
   a first inclined surface inclined toward said light exit surface side, and
   a second inclined surface inclined toward said counter light exit surface.

6. The area light source device according to claim 1, wherein
   said light guide plate has, on said light entrance surface, M-shaped parts which are of an M-shaped configuration as seen in plan view such that protruding portions protruding toward said point light sources are provided at positions opposed to said point light sources and between adjacent ones of said point light sources.

7. The area light source device according to claim 6, wherein
   said protruding portions include two flat inclined surfaces.

8. The area light source device according to claim 7, wherein
   the angle formed by an inclined surface of said protruding portions opposed to said point light sources and said point light sources is not less than 20 degrees.

9. The area light source device according to claim 6, wherein
   said protruding portions opposed to said point light sources are formed by a curved surface.

10. A display device comprising
    a display element disposed in a position opposed to said light exit surface of the area light source device as recited in claim 1.

11. The area light source device according to claim 3, wherein
    said light guide plate has an inclined surface at a constant angle on said light exit surface or said counter light exit surface opposite from the side from which said protruding structure protrudes.

12. The area light source device according to claim 11, wherein
    said light entrance surface of said light guide plate has
    a first inclined surface inclined toward said light exit surface side, and
    a second inclined surface inclined toward said counter light exit surface.

13. The area light source device according to claim 3, wherein
    said light guide plate has, on said light entrance surface, M-shaped parts which are of an M-shaped configuration as seen in plan view such that protruding portions protruding toward said point light sources are provided at positions opposed to said point light sources and between adjacent ones of said point light sources.

14. The area light source device according to claim 13, wherein
    said protruding portions include two flat inclined surfaces.

15. The area light source device according to claim 14, wherein
    the angle formed by an inclined surface of said protruding portions opposed to said point light sources and said point light sources is not less than 20 degrees.

16. The area light source device according to claim 13, wherein
    said protruding portions opposed to said point light sources are formed by a curved surface.

* * * * *